US011043058B2

(12) United States Patent
Temboury et al.

(10) Patent No.: US 11,043,058 B2
(45) Date of Patent: Jun. 22, 2021

(54) OPTICALLY DETECTABLE MARKER INCLUDING LUMINESCENT DOPANTS AND SYSTEM AND METHOD FOR READING SUCH MARKERS

(71) Applicant: UNIVERSITY OF COPENHAGEN, Copenhagen (DK)

(72) Inventors: Miguel Rafael Carro Temboury, Copenhagen (DK); Tom André Jos Vosch, Copenhagen (DK); Riikka Matleena Arppe, Copenhagen (DK); Thomas Just Sørensen, Copenhagen (DK)

(73) Assignee: UNIVERSITY OF COPENHAGEN, Copenhagen (DK)

( * ) Notice: Subject to any disclaimer, the term of this patent is extended or adjusted under 35 U.S.C. 154(b) by 0 days.

(21) Appl. No.: 16/478,573

(22) PCT Filed: Jan. 22, 2018

(86) PCT No.: PCT/EP2018/051452
§ 371 (c)(1),
(2) Date: Jul. 17, 2019

(87) PCT Pub. No.: WO2018/134405
PCT Pub. Date: Jul. 26, 2018

(65) Prior Publication Data
US 2020/0051358 A1    Feb. 13, 2020

(30) Foreign Application Priority Data

Jan. 23, 2017   (EP) .................................... 17152670

(51) Int. Cl.
*G07D 7/1205* (2016.01)
*G07D 7/202* (2016.01)
(Continued)

(52) U.S. Cl.
CPC ............ *G07D 7/1205* (2017.05); *C09K 11/02* (2013.01); *C09K 11/7766* (2013.01); *G07D 7/202* (2017.05)

(58) Field of Classification Search
CPC ..................................................... G07D 7/1205
See application file for complete search history.

(56) References Cited

U.S. PATENT DOCUMENTS 7,995,196 B1 *   8/2011   Fraser ...................... G06K 9/18
                                                            356/71
8,523,238 B2 *   9/2013   Sekine ................... B42D 25/29
                                                            283/92
(Continued)

FOREIGN PATENT DOCUMENTS

DE    10 2014 016858 A1    8/2015

OTHER PUBLICATIONS

International Search Report and Written Opinion of International Searching Authority for Application No. PCT/EP2018/051452, dated Feb. 23, 2018 (9 pages).

*Primary Examiner* — Shawn Decenzo
(74) *Attorney, Agent, or Firm* — Nixon Peabody LLP (57) ABSTRACT

An optically detectable marker having a matrix material, which is doped with individual luminescent dopants, including a first luminescent dopant and a second luminescent dopant. The first luminescent dopant includes a first unique absorption band such that the first dopant may be excited by illumination of a first wavelength. The first dopant is distributed in the matrix material so as to form a first spatial pattern in the matrix material, which pattern may be optically detected by illuminating the marker by a light source illuminating light of the first wavelength. The second luminescent dopant includes a second unique absorption band such that the second dopant may be excited by illumination of a second wavelength, different from the first. The second
(Continued)

dopant is distributed in the matrix material so as to form a second spatial pattern in the matrix material, which pattern may be optically detected by illuminating the marker by a light source illuminating light of the second wavelength.

20 Claims, 4 Drawing Sheets

(51) Int. Cl.
*C09K 11/02* (2006.01)
*C09K 11/77* (2006.01)

(56) References Cited

U.S. PATENT DOCUMENTS

| | | | |
|---|---|---|---|
| 2004/0112962 A1 | 6/2004 | Farrall | |
| 2004/0262547 A1 | 12/2004 | Ross | |
| 2006/0161788 A1* | 7/2006 | Turpin | G06K 9/4652 |
| | | | 713/186 |
| 2006/0180792 A1* | 8/2006 | Ricci | C03C 12/00 |
| | | | 252/301.16 |
| 2009/0008924 A1* | 1/2009 | Ophey | G06K 19/086 |
| | | | 283/85 |
| 2010/0102250 A1 | 4/2010 | Li | |
| 2011/0164748 A1 | 7/2011 | Kohlert | |
| 2015/0324677 A1 | 11/2015 | Talyansky | |
| 2017/0076530 A1* | 3/2017 | Kecht | G01N 21/6428 |
| 2017/0116809 A1* | 4/2017 | Anand | G07D 7/205 |
| 2018/0174389 A1* | 6/2018 | Dobrinsky | G07D 7/205 |
| 2018/0361778 A1* | 12/2018 | Dorier | B42D 25/405 |
| 2019/0005758 A1* | 1/2019 | Kim | G07D 7/205 |
| 2019/0012867 A1* | 1/2019 | Okada | G06K 9/2036 |

* cited by examiner

OPTICALLY DETECTABLE MARKER INCLUDING LUMINESCENT DOPANTS AND SYSTEM AND METHOD FOR READING SUCH MARKERS

CROSS-REFERENCE TO RELATED APPLICATIONS

This application is a U.S. National Stage of International Application No. PCT/EP2018/051452, filed Jan. 22, 2018, which claims the benefit of European Patent Application No. 17152670.0, filed Jan. 23, 2017, both of which are incorporated herein by reference in their entireties.

FIELD OF THE INVENTION

The present invention relates to an optically detectable marker, a product provided with such an optically detectable marker as well as a system and method for reading out such optically detectable markers.

BACKGROUND OF THE INVENTION

Anti-counterfeit tagging using reliable optical methods may provide the solution for addressing the billion-dollar economic losses imposed by counterfeiting and may save lives if used to guarantee the authenticity of medicine.

Most optical methods for anti-counterfeit tagging rely on the analysis of the emitted light of for instance organic dyes with broad spectral features or quantum dots. These methods require either a spectrometer of specific filter sets and are vulnerable to intensity variations, crosstalk and are relatively easy to replicate. The origin of the emitted light cannot be unambiguously determined, and a broad range of excitation wavelengths can result in emission.

US 2004/0112962 discloses security tags with randomly oriented particles embedded in a light transmitting matrix. The read-out of the security tag is based on interpreting light reflected, refracted or diffracted by the particles in the matrix. The intensity and colour variation stems from the host material onto which the security tag has been deposited, which makes the read-out dependent on the host material.

US 2004/0262547 discloses an optically detectable security marker that relies on emitted light at a pre-selected wavelength. The marker comprises a rare earth dopant and a carrier incorporating the rare earth dopant. The interaction of the carrier and the dopant is such that the fluorescent fingerprint of the marker is different from that of the rare earth dopant. The emission profile of the security marker may be detected and compared with a security profile. The system is thus encumbered with the aforementioned disadvantages.

US 2010/0102250 discloses a phosphor material based authentication system, in which a blend of at least two and preferably three or more phosphor materials are used as a photo-luminescent security marking, which is applied to or incorporated within an article to be authenticated. The authenticity of the article can be authenticated by verification of the composition of the phosphor by exciting the marking and comparing one or more selected parameters of light emitted by the security marking with corresponding parameters of the characteristic emission spectrum of the authentic phosphor blend. The authentication system is also encumbered with the aforementioned disadvantages.

US 2011/0164748 discloses a packaging film, which contains pigment particles randomly distributed in low surface-area density used for the authentication for products. The positional coordinates, and optionally the colour values, of the pigment particles contained in the packaging film are determined from a digital image by means of a computer program and an identification code is calculated from the coordinate or colour values and stored in a database. To authenticate the product later, a single, new digital image is recorded and a test code is determined and compared with the recorded identification code.

SUMMARY OF THE INVENTION

It is an object of the invention to obtain an optically detectable marker, a product provided with such an optically detectable marker as well as a system and method for reading out such optically detectable markers, which overcome or ameliorate at least one of the disadvantages of the prior art or which provide a useful alternative.

According to a first aspect, the invention provides an optically detectable marker comprising a matrix material, which is doped with a plurality of individual luminescent dopants and comprising at least a first luminescent dopant and a second luminescent dopant, wherein the first luminescent dopant comprises a first unique absorption band such that the first luminescent dopant may be excited by illumination of a first wavelength, and wherein the first luminescent dopant is distributed in the matrix material so as to form a first spatial pattern in the matrix material, which first spatial pattern may be optically detected by illuminating the optically detectable marker by a light source illuminating light of the first wavelength, and the second luminescent dopant comprises a second unique absorption band such that the second luminescent dopant may be excited by illumination of a second wavelength, different from the first wavelength, and wherein the second luminescent dopant is distributed in the matrix material so as to form a second spatial pattern in the matrix material, which second spatial pattern may be optically detected by illuminating the optically detectable marker by a light source illuminating light of the second wavelength.

Accordingly, it is seen that the first luminescent dopants may be distributed in the matrix material so as to form a first spatial pattern and the second luminescent dopants may be distributed in the matrix material so as to form a second spatial pattern. The patterns emerge, when the dopants are illuminated with light of the individual unique absorption band. The patterns may be divided into individual areas or pixels in the marker. Accordingly, it is seen that each individual area or pixel may comprise two three bits of information as absence of both dopants also accounts for information. If co-localization of dopants in one pixel is allowed, then each pixel may comprise four bits of information. If the marker for instance is divided into 60×60 pixels, the dopants may provide $4^{3600}$ different combinations, or $3^{3600}$ when excluding the co-localized signal from two different dopants in one pixel. Since the dopants typically will have a random distribution in the matrix material, each marker will have a unique spatial pattern. Accordingly, the unique spatial patterns of markers may be used as security or anti-counterfeiting tags or the like and are impossible to clone, thereby providing a true physical unclonable function device (PUF device). The optical marker may in this regard be perceived as carrying a PUF device. After having applied the marker to a product, the spatial patterns may be recorded and stored in a database. Thus, a later readout of the marker may be used to check the authenticity of the product by comparing the readout with the stored spatial patterns from the database. However, the readout method has to be linked to the spatial patterns and thus include illumination that specifically targets the individual dopants. Accordingly, the read-out of the spatial patterns in a unique digital identifier can be used as a digital fingerprint and to encrypt electronic data.

The number of possible combinations may be expanded by adding additional different dopants with unique absorption bands in order to provide additional spatial patterns by illumination of additional unique absorption bands. Accordingly, the invention also provides an optically detectable marker, wherein the individual luminescent dopants further comprises a third luminescent dopant, wherein the third luminescent dopant comprises a third unique absorption band such that the third luminescent dopant may be excited by illumination of a third wavelength, different from the first wavelength, and wherein the third luminescent dopant is distributed in the matrix material so as to form a third spatial pattern in the matrix material, which third spatial pattern may be optically detected by illuminating the security tag by a light source illuminating light of the third wavelength.

If the marker for instance is divided into 60×60 pixels, the marker may provide $8^{3600}$ or $7^{3600}$ different combinations if allowing co-localisation of dopants in each pixel ($7^{3600}$ if excluding co-localisation of three dopants in pixels). The number of possible combinations may of course be expanded further by increasing the number of pixels and by adding a fourth different dopant with unique absorption band in order to provide additional spatial patterns by illumination. However, the use of three (or even two) individual dopants is sufficient to provide a huge number of random patterns and thus a PUF device. The addition of additional dopants may introduce crosstalk or other noise sources to the readout of the optically detectable marker.

The first spatial pattern and second spatial pattern are observable when the first dopants and second dopants are excited, respectively, and emit light. The wavelength range observed or detected for the individual dopants may be the same.

Ideally, the characteristics of absorption bands of the individual luminescent dopants are such that by illuminating the optically detectable marker, only a single luminescent dopant is excited and emits light. However, in practice, it may be difficult to avoid crosstalk, i.e. partial excitation of one or more of the other luminescent dopant. Accordingly, the unique absorption band may be defined as a wavelength range, in which the intensity of emitted light from excitation of the targeted luminescent dopant due to illumination of light at the targeted wavelength is substantially higher than the intensity of emitted light from excitation of the luminescent dopants other than the targeted luminescent dopant. The ratio between the intensity of emitted light from the targeted luminescent dopant and the intensity of emitted light from one of the other luminescent dopants may for instance defined to be at least 3:1 and preferably at least 7:1. The ratio may advantageously be at least 10:1. The ratio may even more advantageously be at least 25:1, 50:1, or 100:1.

According to an advantageous embodiment, the individual luminescent dopants are randomly distributed in the matrix material. The randomly distributed dopants may be accomplished during manufacture of the optical marker, where the dopants may be mixed into the matrix material.

According to another advantageous embodiment, the matrix material is a material chosen from the group of: PVA, PMMA, epoxy, glass, wood, synthetic polymers, biological polymers, plastics, inks, ceramics, lacquer, glue, resins, paper, nail polish, leather, inks, graphite, and chalk. However, any suitable material may be used as a matrix material, as long as the dopants may be locked in the matrix material, such that the specific spatial patterns may be maintained. The dopants may for instance be printed on surface, embedded, engraved or textured into the matrix material.

According to a particular advantageous embodiment, the individual luminescent dopants are contained in individual carriers that are embedded in the matrix material. The individual carriers may for instance be a porous material, and the dopant thus "colour" the carrier. The individual carriers may be provided as particles. The individual carriers may carry one or more different dopants. In a highly advantageous embodiment, the individual carriers are microporous, mesoporous or macroporous structures. In one embodiment, the individual carriers are zeolites. Accordingly, the zeolite material, which is microporous, may function as a scaffold carrying the individual luminescent dopants.

The individual luminescent dopants may for instance be chosen from the group of: luminescent dyes, luminescent elements, quantum dots, rare earth dopants or lanthanides. Lanthanides are particular advantageous and are not prone to bleaching. In a preferred embodiment, the lanthanides are excited by light matching intrinsic lanthanide specific transitions.

In another advantageous embodiment, the individual luminescent dopants include lanthanides chosen from the group of: Ce, Nd, Sm, Ho, Pr, Dy, Eu, Tm, Yb, Tb, or Er. The lanthanides may advantageously be chosen from the group of europium, terbium and dysprosium ions, e.g. $Eu^{3+}$, $Tb^{3+}$, and $Dy^{3+}$. These ions inherently comprise individual absorption band, which are close to each other in wavelengths. This will add additional security to the marker, since the individual lanthanides cannot readily be individually targeted with a broadband light source but instead need to be targeted with specific narrowband light sources.

It is recognized that the absorption/excitation bands of the individual dopants in principle may be spaced spectrally far apart, such as up to 1000 nm, or up to 500 nm. However, as outlined above, the absorption/excitation bands may advantageously be close to each other. Therefore, according to an advantageous embodiment the first wavelength and the second wavelength are close to each other, preferably within 100 nm of each other and more preferably within 50 nm of each other. In other words, neighboring unique absorption bands of the individual luminescent dopants are preferably located within 100 nm and more preferably within 50 nm of each other. Even more preferably, neighboring unique absorption bands of the individual luminescent dopants are located within 35 nm of each other and even more preferably within 25 nm of each other. This may also make it more likely that the emitted and detectable wavelengths are in the same range.

The dopants may advantageously have an average diameter of 0.1-100 µm, more advantageously 1-10 µm. The carriers, such as zeolites may have an average diameter of 0.1-100 µm, or advantageously 1-10 µm. Average diameter means the average inner dimensions of the dopant or carrier. The optical detectable marker may advantageously have a side dimension or average inner dimension of 10 µm to 10 mm. The optical detectable marker may for instance be rectangular or square. The spatial patterns may for instance be digitized into a pixel image having a side dimension of at least five pixels, e.g. being at least 5×5 pixels. Advantageously, the digitized image may have a side dimension of at least 10 pixels, e.g. being 10×10 pixels or 10×20 pixels.

According to a second aspect, the invention provides a product provided with an optically detectable marker according to any of the aforementioned embodiments.

The optically detectable marker can be provided on the product in a number of ways. The marker may for instance be provided as a thin film, such as a polymer film. The film may be sealed so as to be scratch resistant. The marker may also be provided as dopants distributed in a glass matrix. The marker may be glued on to product or imprinted. It can also be embedded in the product. The individual dopants are advantageously embedded in the matrix with a spacing to the surface so as to make the marker scratch resistant. In general, the individual dopants or carriers carrying the dopants need to be locked in the matrix material so that the detectable spatial patterns are stable. The dopants or carriers carrying the dopants can be part of an ink that can be printed on the product or the optical detectable marker can be provided on a label that can be fixed to the product.

According to a third aspect, the invention provides a security system comprising:
    an optically detectable marker according to any of the preceding claims, and
    an optical read-out system, which comprises:
        one or more light sources that are configured to separately target the unique absorption bands of the individual luminescent dopants of the optically detectable marker, and
        A detection system for reading out a spatial pattern associated with the individual luminescent dopants of the optically detectable marker.

The security system ensures that the contrast between the individual luminescent dopants is generated from the unique absorption bands. It is not necessary to discriminate the emitted light from the luminescent dopants, and in general, all emitted wavelengths are detected. More importantly, the emitted wavelengths from all individual luminescent dopants may be detected and recorded in the same wavelength range.

According to an advantageous embodiment, the security system further comprises a database of stored security tags. The database may be stored locally or on an external server. The stored security tags preferably comprise digitized images of the first spatial pattern and the second spatial pattern of optical detectable markers. The images may be recorded, when the optical detectable markers are manufactured or applied to a product, whereby the security tags may be used to establish the authenticity of the product.

According to another advantageous embodiment, the security system further comprises a comparison module, which is configured to compare detected spatial patterns or images with stored security tags. The comparison module may provide a signal to indicate whether or not the optically detectable marker corresponds to a stored security tag.

In one embodiment, the one or more light sources comprise a tunable light source, such as a tunable laser. This provides a simple method for separately targeting the unique absorption bands of the individual luminescent dopants. The system or light source may advantageously comprise a narrowband filter to ensure that only specific wavelengths and absorption bands are targeted. Other embodiments could include a combination of a number of fixed wavelength lasers or light sources.

In general, the same detection wavelengths are observed for all the individual luminescent dopants. However, according to one embodiment, the system may further comprise a detector filter, e.g. a programmable filter. The filter may for instance be utilized to observe specific emission wavelength ranges for the individual luminescent dopants. This may lower cross-talk or eliminate it entirely for detection of the first and the second spatial pattern.

According to a fourth aspect, the invention provides a method of reading out an optically detectable marker, wherein
    the optically detectable marker comprises a matrix material, which is doped with a plurality of individual luminescent dopants comprising at least:
        a first luminescent dopants comprising a first unique absorption band such that the first luminescent dopants may be excited by illumination of a first wavelength, wherein the first luminescent dopants are arranged in a first spatial pattern in the optically detectable marker; and
        a second luminescent dopants comprising a second unique absorption band such that the second luminescent dopants may be excited by illumination of a second wavelength, wherein the second luminescent dopants are arranged in a second spatial pattern in the optically detectable marker, wherein the method comprises the steps of:
    a) optically exciting the first luminescent dopants by illuminating the optically detectable marker with light of the first wavelength,
    b) reading out the first spatial pattern,
    c) optically exciting the second luminescent dopants by illuminating the optically detectable marker with light of the second wavelength, and
    d) reading out the second spatial pattern.

Steps a) and b) may be repeated for each of the plurality of individual luminescent dopants. Thus, it is seen that the invention provides a readout method, where the individual spatial patterns formed by the individual luminescent dopants in the matrix material are read out separately by targeting the individual and unique absorption bands of the individual luminescent dopants.

The method may also comprise the additional step of: A) illuminating the optically detectable marker by scattered light or light in a wavelength lower than the first and second wavelength, as well as the third wavelength, if a marker with a third luminescent dopant, e.g. with a wavelength below 400 nm, and B) reading out an overall pattern.

According to an advantageous embodiment, the read out spatial patterns are run through a noise-reducing filtering process, e.g. comprising steps of:
    subtracting background noise levels, and/or
    digitizing pixels by comparing intensities of a pixel after different excitations according to crosstalk thresholds, and/or
    digitizing pixels by comparing measured intensity levels with predetermined intensity threshold levels.

The background noise corresponds to the normal measured counts of photons per time unit. The background noise can be measured by measuring an output without illuminating the optical detectable marker. Crosstalk can be reduced by comparing measured intensity level with a threshold level. The threshold level may for instance be set according to the aforementioned ratios that can be used to define the unique absorption bands. The whole system may for instance be calibrated or normalized in relation to a maximum read out intensity level.

In another embodiment background noise and crosstalk can be further reduced by using pulsed excitation sources in combination with time-correlated single photon counting detection and photon arrival time based signal filtering and noise reduction.

In another advantageous embodiment, the first spatial pattern detected in step b) and the second spatial pattern detected in step d) is compared to security tag stored in a database. The method may additionally return a message or signal to indicate whether or not the detected spatial patterns correspond to a stored security tag.

The match level (e.g. number of pixels matching) between the detected spatial pattern and the stored security tag should be above 50% in order to avoid a random match. However, due to noise levels and other sources of errors, it is not practical to set the match level to a 100%. However, due to the nature of the PUF device, it is sufficient to set the match level to 55% or higher in order to correctly identify a tag. The match level may for instance be set to at least 55%, 60%, 65%, 70%, 75%, 80%, 85%, 90%, or 95%.

It is also possible to add an additional luminescent dopant to the optical detectable tag, which is not used for measuring a separate spatial pattern. Such an additional tag can be used to add noise to a read out security tag, e.g. by being excited and emitting light if illuminated with the wrong wavelengths, e.g. when illuminated by a broadband (white) light source. Similarly, an additional luminescent dopant can be added to cover a time domain after excitation that is not used in the photon arrival time based signal filtering and noise reduction.

The optical detectable marker may be used for any of the following tasks: to encrypt data; as a random number seed for gaming machines; as method for uniquely identifying and/or establishing the authenticity of an object, device or person; for the establishment of authenticity of bulk materials or subcomponents; for the establishment of identity of persons for secure digital access; for the establishment of identity of persons for electronic signatures and electronic payments; as a physical key identifying an asset represented in a blockchain ledger; as a physical key asserting ownership of a blockchain wallet; as a distributed identification of devices in a machine-to-machine network; and for the establishment of authenticity of currency, contracts, duty stamps or other official seals.

A preferred embodiment provides an optically detectable marker comprising a matrix material, which is doped with a plurality of individual luminescent dopants and comprising at least a first luminescent dopant, a second luminescent dopant, and a third luminescent dopant, wherein the first luminescent dopant comprises a first unique absorption band such that the first luminescent dopant may be excited by illumination of a first wavelength, and wherein the first luminescent dopant is distributed in the matrix material so as to form a first spatial pattern in the matrix material, which first spatial pattern may be optically detected by illuminating the optically detectable marker by a light source illuminating light of the first wavelength, the second luminescent dopant comprises a second unique absorption band such that the second luminescent dopant may be excited by illumination of a second wavelength, different from the first wavelength, and wherein the second luminescent dopant is distributed in the matrix material so as to form a second spatial pattern in the matrix material, which second spatial pattern may be optically detected by illuminating the optically detectable marker by a light source illuminating light of the second wavelength, and the third luminescent dopant comprises a third unique absorption band such that the third luminescent dopant may be excited by illumination of a third wavelength, different from the first and the second wavelength, and wherein the third luminescent dopant is distributed in the matrix material so as to form a third spatial pattern in the matrix material, which third spatial pattern may be optically detected by illuminating the security tag by a light source illuminating light of the third wavelength, wherein the first wavelength, the second wavelength, and the third wavelength are located within 50 nm of each other, advantageously between 445 nm and 495 nm.

This optically detectable marker or PUF device provides a security level, which hitherto has not been seen. As previously mentioned, the security level may be even higher, if the marker or device is combined with illumination of the marker or device with scattered light or light of a lower wavelength to bring out an overall image.

Preferably, the first luminescent dopant, the second luminescent dopant, and the third luminescent dopant are lanthanides chosen from the group of europium, terbium and dysprosium ions, e.g. $Eu^{3+}$, $Tb^{3+}$, and $Dy^{3+}$.

Similarly, a preferred embodiment provides a method of reading out an optically detectable marker, wherein the optically detectable marker comprises a matrix material, which is doped with a plurality of individual luminescent dopants comprising at least:
  a first luminescent dopants comprising a first unique absorption band such that the first luminescent dopants may be excited by illumination of a first wavelength, wherein the first luminescent dopants are arranged in a first spatial pattern in the optically detectable marker;
  a second luminescent dopants comprising a second unique absorption band such that the second luminescent dopants may be excited by illumination of a second wavelength, wherein the second luminescent dopants are arranged in a second spatial pattern in the optically detectable marker; and
  a third luminescent dopants comprising a third unique absorption band such that the third luminescent dopants may be excited by illumination of a third wavelength, wherein the second luminescent dopants are arranged in a third spatial pattern in the optically detectable marker wherein the method comprises the steps of:
a) optically exciting the first luminescent dopants by illuminating the optically detectable marker with light of the first wavelength,
b) reading out the first spatial pattern,
c) optically exciting the second luminescent dopants by illuminating the optically detectable marker with light of the second wavelength,
d) reading out the second spatial pattern,
e) optically exciting the third luminescent dopants by illuminating the optically detectable marker with light of the third wavelength, and
f) reading out the third spatial pattern,
wherein the first wavelength, the second wavelength, and the third wavelength are located within 50 nm of each other, advantageously between 445 nm and 495 nm.

The method may comprise the additional step of:
A) illuminating the optically detectable marker by scattered light or light in a wavelength lower than the first and second wavelength, e.g. with a wavelength below 400 nm, and
B) reading out an overall pattern.

BRIEF DESCRIPTION OF THE FIGURES

The invention is explained in detail below with reference to embodiments shown in the drawings, in which.

DETAILED DESCRIPTION OF THE INVENTION

Figure 1:
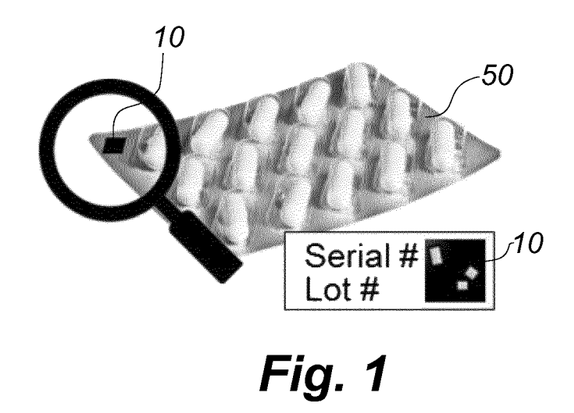
FIG. 1 illustrates a product provided with an optically detectable marker according to the invention.

FIG. 1 illustrates a product 50 in form of a blister pack with medicine. The product is provided with a serial tag that comprises an optically detectable marker 10 according to the invention. For medical products, it may save lives, if such markers 10 can be used to authenticate the origin and authenticity of the medicine.

Figure 2:
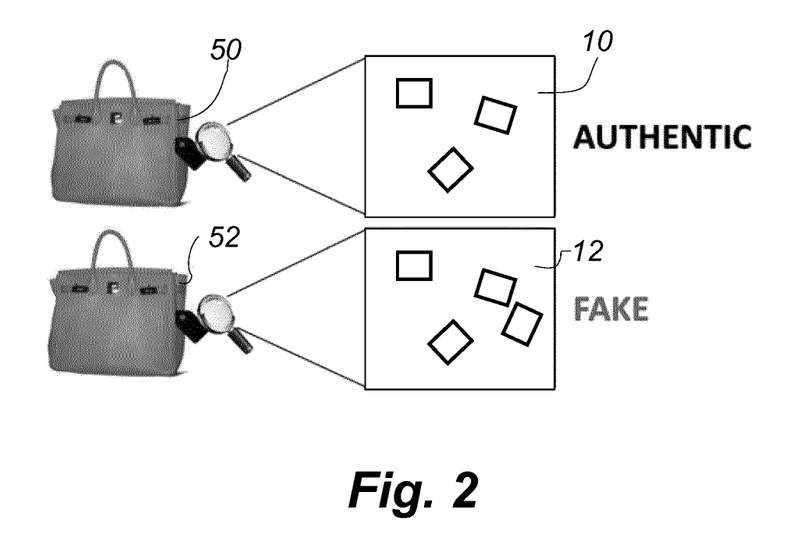
FIG. 2 illustrates an authentic product and a counterfeit product.

FIG. 2 shows another authentic product 50 in form of a handbag and a counterfeit handbag 52. The authentic product 50 has been provided with an optically detectable marker 10 or PUF device, which in an optical read-out method reveals a particular image or pattern. The image or pattern from the optically detectable marker 10 can be used to authenticate the product 50, for instance by comparing the image with an image from a database. The counterfeit handbag 52 instead comprises a fake optically detectable marker 12. If no matches of the fake marker 12 can be found in the database, it can be concluded that the product 52 is likely to be a counterfeit product. It is also possible to use the serial number, e.g. as illustrated in FIG. 1, to compare marker with a marker stored together with the serial number in the database.

The present invention in general relates to anti-counterfeit tagging using a reliable optical method to read out the tag and which cannot easily be copied or cloned.

Figure 5:
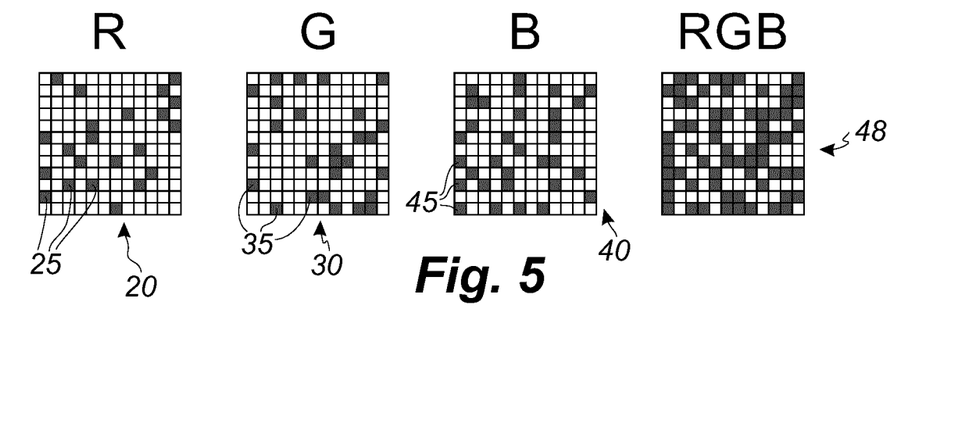
FIG. 5 illustrates spatial patterns formed by individual luminescent dopants in an optically detectable marker according to the invention as well as a combined image formed by the spatial patterns.

FIG. 5 illustrates spatial patterns formed by individual luminescent dopants in an optically detectable marker 10 according to the invention as well as a combined image formed by the spatial patterns.

The optically detectably marker 10 according to the invention is made of a matrix material, such as a polymer, which is doped with a plurality of different types of luminescent dopants, which are distributed, advantageously randomly, in the matrix material. Each of the different types of luminescent dopants form separate spatial patterns in the optically detectable marker. Each of the different types of luminescent dopants has a unique absorption band such that the luminescent dopants may be excited by illumination of light having a wavelength within the unique absorption band. Accordingly, it is possible to only excite one type of luminescent dopant at a time and a spatial pattern relating to the particular luminescent dopant type may be read out separately. The detected spatial patterns may be digitized and divided into pixels. By using a plurality of different types of luminescent dopants, a single pixel may contain more than 1 bit of information, which dramatically increases the number of possible unique tags. By using two different luminescent dopants, each pixel may have up to four different values. By dividing the optical detectable marker 10 into a digitized image of only 5×5 pixel, the number of unique tags becomes $3^{25}=8.47 \times 10^{11}$ or $4^{25}=1.13 \times 10^{15}$. If three different types of luminescent dopants are used, the number of unique tags increases even more dramatically to $7^{25}=1.34 \times 10^{21}$ or $8^{25}=3.78 \times 10^{22}$.

However, according to the invention, the number of pixels may be even higher, e.g. at least having a side dimension of at least 5, 10, 15, 20, 25, 30, 60, or 100 pixels. The images of course need not be square. The pixels may also comprise a 3D matrix arranged by X, Y and Z coordinates. Further, security levels may be extended with time in a 4D blockchain-like system.

Further, by using at least two different types of luminescent dopants that individually form spatial patterns in the marker, the luminescent dopants have to be targeted individually with a light source having wavelengths that substantially only excites the targeted luminescent dopant and substantially does not excite the other luminescent dopant. This adds a further security aspect to the markers.

FIG. 5 illustrates the principle above by use of digitized images of the optically detectable marker 10 having three different types of luminescent dopants distributed in the matrix material of the optically detectable marker 10. The example is illustrated as a 12×12 pixel image.

A first spatial pattern 20 is formed in the optically detectable marker 10 by first luminescent dopants 25 of a first type distributed in the matrix material of the optically detectable marker 10. The first spatial pattern 20 emerges by targeting the unique absorption band of the first luminescent dopants 25 by illuminating the optically detectable marker 10 with light of a first wavelength. The first luminescent dopants 25 are thereby excited and emit light, whereby the position of the luminescent dopants 25 may be detected and hence the first spatial pattern 20.

Similarly, a second spatial pattern 30 is formed in the optically detectable marker 10 by second luminescent dopants 35 of a second type distributed in the matrix material of the optically detectable marker 10. The second spatial pattern 30 emerges by targeting the unique absorption band of the second luminescent dopants 35 by illuminating the optically detectable marker 10 with light of a second wavelength. The second luminescent dopants 35 are thereby excited and emit light, whereby the position of the luminescent dopants 35 may be detected and hence the second spatial pattern 30.

Similarly, a third spatial pattern 40 is formed in the optically detectable marker 10 by third luminescent dopants 45 of a third type distributed in the matrix material of the optically detectable marker 10. The third spatial pattern 40 emerges by targeting the unique absorption band of the third luminescent dopants 45 by illuminating the optically detectable marker 10 with light of a third wavelength. The third luminescent dopants 45 are thereby excited and emit light, whereby the position of the luminescent dopants 45 may be detected and hence the third spatial pattern 40.

The three spatial patterns may form different channels in a combined image 48, similar to the three channels in an RGB image. The combined image or the individual spatial images 20, 30, 40, or both may be stored in a database for later authentication.

As an additional security, the combined image 48 or overall image may also be visualized and detected by illuminating the optical detectable marker by scattered light or using a wavelength that is lower than that of the first, second, and third wavelength.

Figure 3:
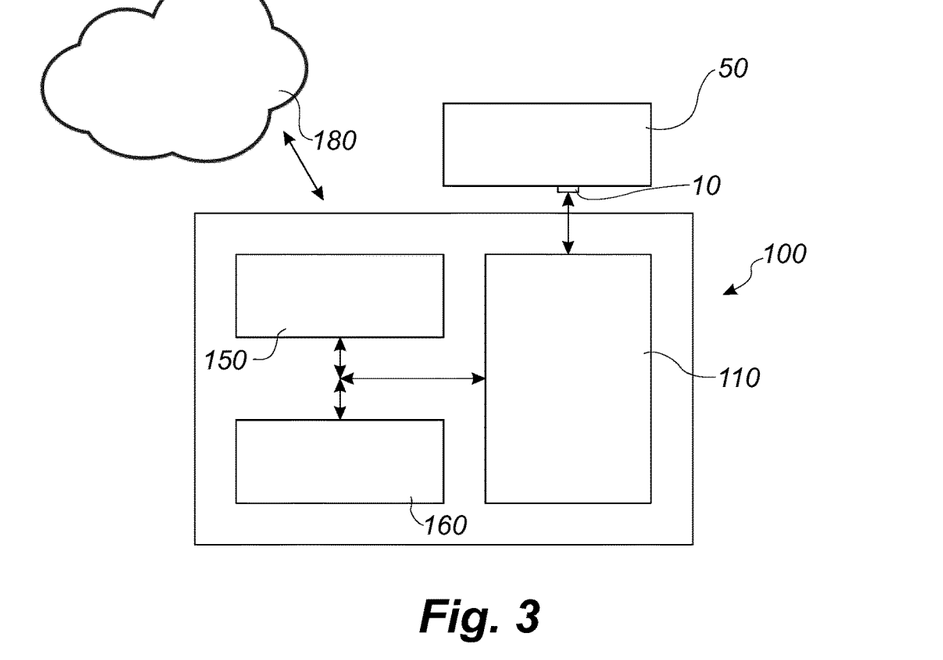
FIG. 3 shows a security system according to the invention.

FIG. 3 shows a security system 100 according to the invention. The security system comprises an optical read-out system 110 for reading out the optically detectable marker 10 of the product 50. The security system comprises a controller 150 and a processor 160 for processing the detected spatial patterns of the optically detectable marker. The system may further comprise a database 180 of stored security tags. The system may further comprise a comparison module, which is configured to compare detected spatial patterns or images with stored security tags stored in the database 180. The database 180 may be implemented in the unit itself or it may be implemented on an external server or cloud solution. It is also possible to attribute a serial number to each code, and the marker may be compared to a stored spatial patterns or images associated with the serial number.

Figure 4:
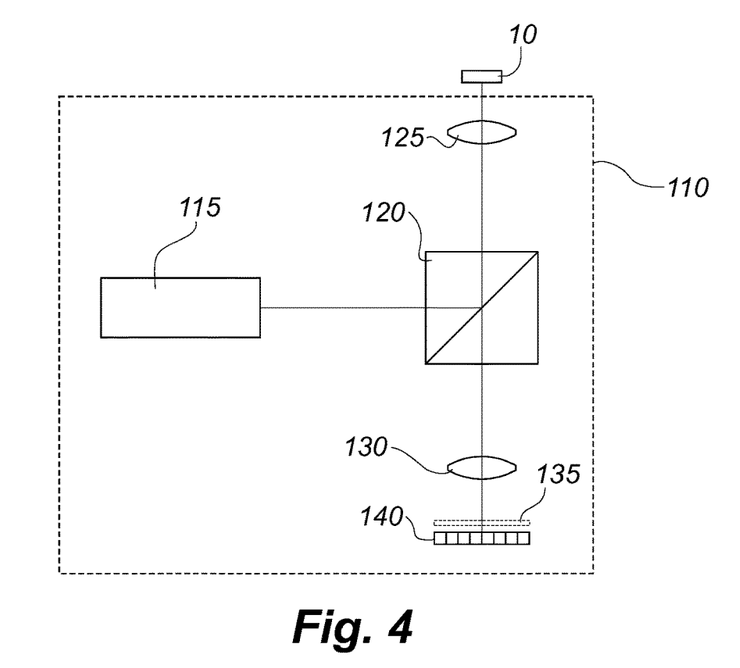
FIG. 4 shows an optical readout system according to the invention.

FIG. 4 shows an example of the optical readout system 110 in more detail. The optical readout system comprises one or more light sources 115. The light source may for instance be a tunable laser, a broadband light source combined with a tunable filter, or different light sources emitting different wavelengths. However, it is important that the one or more light sources can be configured such that only one of the luminescent dopants are targeted and excited at a time. The optical readout system 110 further comprises a detection system for reading out a spatial pattern associated with the individual luminescent dopants of the optically detectable marker 10. The detection system may comprise an imaging system including for instance a first lens 125 and a second lens 130, a detector array 140, such as a CCD, CMOS array, APD, PMT or any other photon detection equipment, and optionally a tunable filter 135.

The one or more light source 115 emits light that is sent to a beam splitter 120 and then on to the optically detectable marker 10 via the first lens 125. The targeted luminescent dopants are excited and emit light, which is sent via the first lens, through the beam splitter 120 and onto the detector array 140 via the second lens 130. Further, as mentioned, the optical readout system 110 may further comprise a tunable filter 135, which can be used to limit crosstalk between light emitted from different types of luminescent dopants.

It is recognized that the optical readout system 110 may be implemented in a number of different ways, but it is important that the optical readout system is configured to target and excite the individual luminescent dopants separately and detect the associated spatial pattern in the optically detectable marker 10.

The individual luminescent dopants may be directly distributed in the matrix material or be contained in individual carriers that are embedded in the matrix material. The individual carriers may for instance be a porous material, and the dopant thus "colour" the carrier. The individual carriers may be provided as particles. The individual carriers may carry one or more different dopants. In one embodiment, the individual carriers are zeolites. Accordingly, the zeolite material, which is microporous, may function as a scaffold carrying the individual luminescent dopants.

The individual luminescent dopants may for instance be chosen from the group of: luminescent dyes, luminescent elements, quantum dots, rare earth dopants or lanthanides. However, lanthanides are particular advantageous, since they are stable and not prone to bleaching.

The lanthanides may advantageously be chosen from the group of europium, terbium and dysprosium ions, e.g $Eu^{3+}$, $Tb^{3+}$, and $Dy^{3+}$. These ions inherently comprise individual absorption bands, which are close to each other in wavelengths. This will add additional security to the marker, since the individual lanthanides cannot readily be individually targeted with a broadband light source but instead need to be targeted with specific narrowband light sources.

Figure 6A:
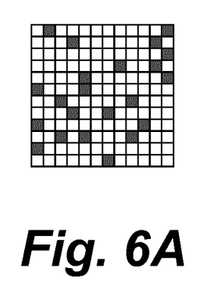
FIGS. 6A and 6B show spatial patterns formed by different observation area sizes.
Figure 6B:
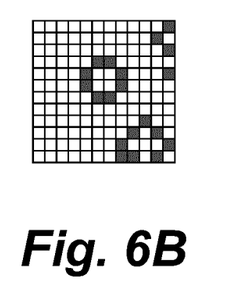

It is recognized that the optically detectable marker 10 may have different sizes and that the resolution of the image may be varied. FIG. 6A illustrates an image where single dopants or carriers only fill one or a few pixels. However, the optically detectable marker 10 may also be observed at a higher resolution, wherein the shape of the dopants or carriers may be observed. In the latter case, the optically detectable marker 10 may physically be smaller, e.g. as small as for instance 10×10 μm.

The dopants may advantageously have an average diameter of 0.1-100 μm, more advantageously 1-10 μm. The carriers, such as zeolites may have an average diameter of 0.1-100 μm, more advantageously 1-10 μm. Average diameter means the average inner dimensions of the dopant or carrier. The optical detectable marker may advantageously have a side dimension or inner dimension of 10 μm to 10 mm. The optical detectable marker may for instance be rectangular or square. The spatial patterns may for instance be digitized into a pixel image having a side dimension of at least five pixels, e.g. being at least 5×5 pixels. Advantageously, the digitized image may have a side dimension of at least 10 pixels, e.g. 10×10 pixels or 10×20 pixels. The relative size between the side dimension of the marker and the average diameter of the dopants may advantageously be at least 2:1, more advantageously at least 3:1 and even more advantageously at least 5:1.

Example

Figure 7:
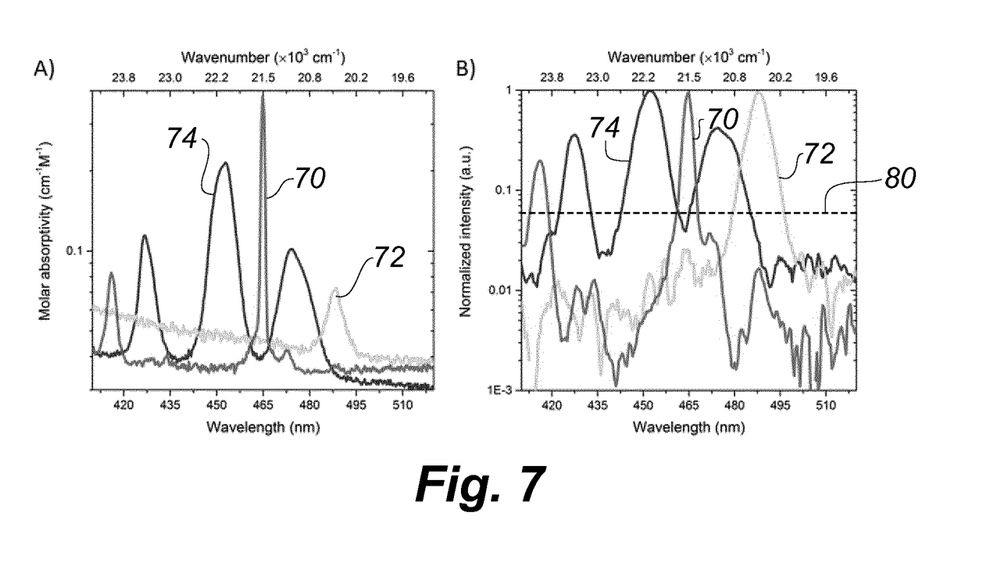
FIGS. 7A and 7B show absorption and normalized excitation spectra for three luminescent dopants suitable for use in the optically detectable marker according to the invention.

The invention for the excitation-selected imaging of optically detectable marker has been demonstrated by the inventors based on lanthanide-doped zeolites. The uniquely narrow absorption peaks of lanthanides enable to use three, energetically closely spaced excitation wavelengths for the selective excitation of $Eu^{3+}$, $Tb^{3+}$, and $Dy^{3+}$. FIGS. 7A and 7B show absorption and normalized excitation spectra for the three lanthanides, respectively.

$Tb^{3+}$ has a unique absorption band 72 with an absorption peak at 488 nm. $Eu^{3+}$ has a unique absorption band 70 with a very narrow absorption peak at 465 nm and another at 416 nm. $Dy^{3+}$ has three absorption peaks at 425 nm, 450 nm, and 475 nm, from which the unique absorption 74 with the best absorptivity is at 450 nm. The combination of the three unique absorption bands gives minimal crosstalk between the three lanthanides. The preferred setup is to use the absorption peaks at 450 nm, 465 nm, and 488 nm. $Dy^{3+}$ absorption peaks are the broadest and, therefore, most excitation crosstalk is expected from $Dy^{3+}$-doped zeolites. Furthermore, $Eu^{3+}$ has a minor absorption peak at 488 nm, which can cause some crosstalk from $Eu^{3+}$-doped zeolites. However, the crosstalk can be minimized or eliminated by comparing the measured intensities to a threshold intensity 80. The different lanthanides also emit light with different spectra. By detecting only specific wavelength ranges relevant for the different lanthanides, it may be possible to eliminate crosstalk entirely. This may for instance be carried out by use of the tunable filter 135 in the optical read-out system 110. Additionally, photon arrival times after pulsed excitation could also be used to minimize or eliminate crosstalk. Finally, an overall or combined image may be visualized and detected by illuminating the optical detectable marker by scattered light or using a wavelength that is lower than that of the first, second, and third wavelength.

Figure 8:
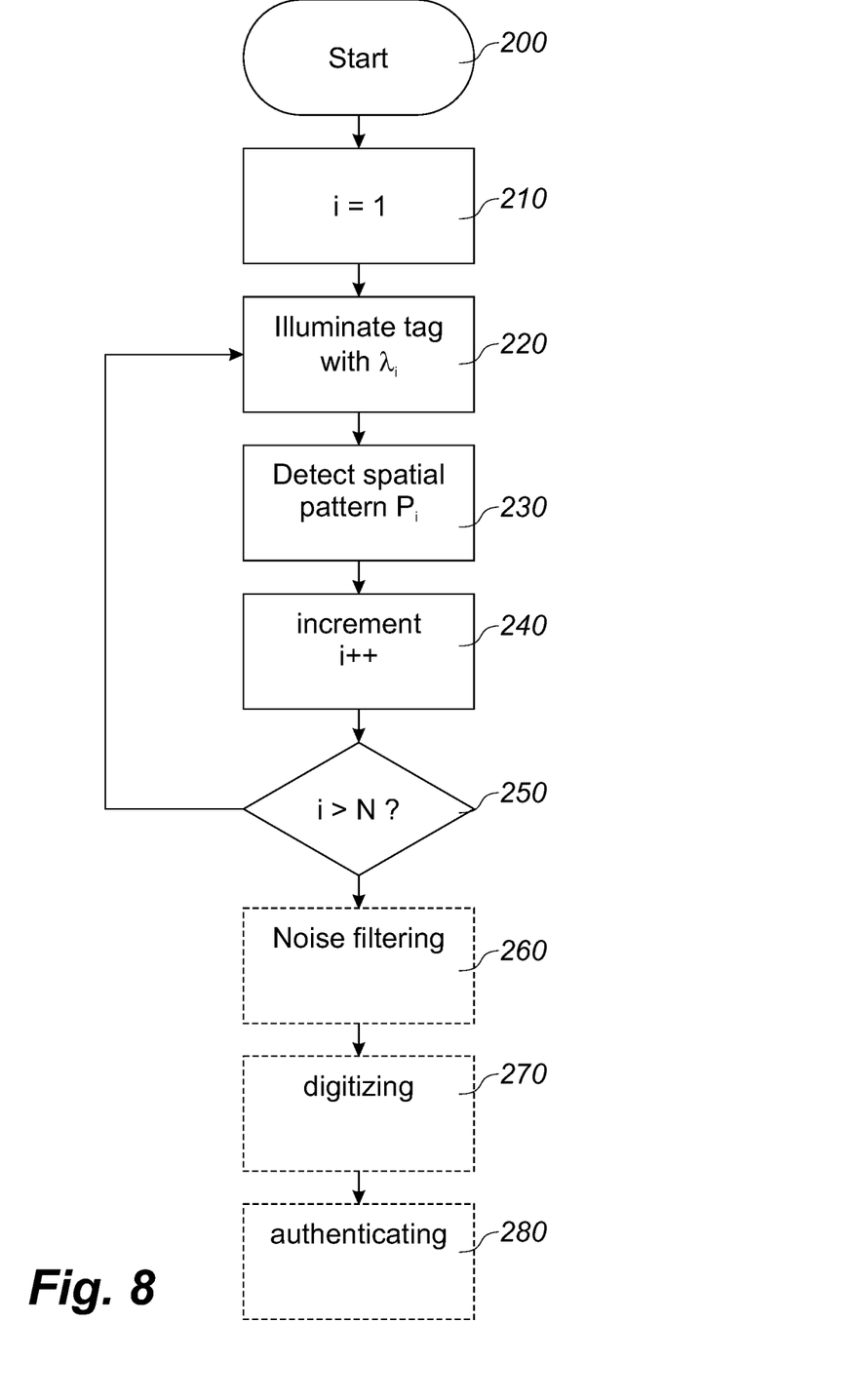
FIG. 8 shows the steps in a method of reading out an optically detectable marker according to the invention.

FIG. 8 shows the steps in a method of reading out an optically detectable marker according to the invention. The method starts at step 200 and initializes the process to start reading out the first spatial pattern at step 210 by setting i=1. The optical detectable marker 10 is first illuminated with a light of wavelength $\lambda_1$ in step 220, and the associated first spatial pattern $P_1$ is detected in step 230. In step 240, i is incremented. In step 250, i is compared to N, which is the number of individual luminescent dopants used in the optically detectable marker. Since N according to the invention is at least 2, steps 220-250 are repeated including first illuminating the optically detectable marker 10 with a light of wavelength 22 detecting the associated second spatial pattern $P_2$. The loop is continued until all luminescent dopants have been separately targeted and excited, and the associated spatial pattern has been detected. Additionally, more wavelengths $\lambda_1 > N$ that do not target any dopant may be used as an additional security layer. As an example, the combined image 48 or overall image may also be visualized and detected by illuminating the optical detectable marker by scattered light or using a wavelength that is lower than that of the first, second, and third wavelength.

The method then continues to an optional noise filtering step 260, where for instance background noise may be subtracted. It is recognized that this step may also be placed in the loop, e.g. between steps 230 and 240. The image is then in step 270 digitized, e.g. by comparing the measured intensities with a threshold level. This may further minimize crosstalk. In a subsequent step 280, the image may be compared with an image stored in a database of security tags in order to authenticate the product 50. It is recognized that various image recognition methods or similar methods may be used to authenticate the product 50, such as for example a simple point by point comparison or a simple cross-correlation function. In general, more than 50% of the image should match the stored tag, preferably at least 55%.

The invention has been described with reference to advantageous embodiments. However, the scope of the invention is not limited to the illustrated embodiments, and alterations and modifications can be carried out without deviating from the scope of the invention, which is defined by the following claims.

| List of Reference Numerals | |
|---|---|
| 10 | Optically detectable marker |
| 12 | Fake marker |
| 20 | First spatial pattern |
| 25 | First luminescent dopant |
| 30 | Second spatial pattern |
| 35 | Second luminescent dopant |
| 40 | Third spatial pattern |
| 45 | Third luminescent dopant |
| 48 | Combined image |
| 50 | Product/authentic product |
| 52 | Counterfeit product |
| 70 | First unique absorption band |
| 72 | Second unique absorption band |
| 74 | Third unique absorption band |
| 80 | Intensity threshold |
| 100 | Security system |
| 110 | Optical read-out system |
| 115 | Laser/light source |
| 120 | Beam splitter |
| 125 | Lens |
| 130 | Lens |
| 135 | Tunable filter |
| 140 | Detector array |
| 150 | Controller |
| 160 | Processor |
| 180 | Cloud/server |
| 200-280 | Steps in method |

The invention claimed is:

1. An optically detectable marker comprising a matrix material, which is doped with a plurality of individual luminescent dopants and comprising at least a first luminescent dopant and a second luminescent dopant, wherein the first luminescent dopant comprises a first unique absorption band such that the first luminescent dopant may be excited by illumination of a first wavelength, and wherein the first luminescent dopant is distributed in the matrix material so as to form a first spatial pattern in the matrix material, which first spatial pattern may be optically detected by illuminating the optically detectable marker by a light source illuminating light of the first wavelength, and the second luminescent dopant comprises a second unique absorption band such that the second luminescent dopant may be excited by illumination of a second wavelength, different from the first wavelength, and wherein the second luminescent dopant is distributed in the matrix material so as to form a second spatial pattern in the matrix material, which second spatial pattern may be optically detected by illuminating the optically detectable marker by a light source illuminating light of the second wavelength, wherein the spatial patterns in the marker are divided into pixels, each pixel being adapted for encoding four different values of information using combinations of the two different luminescent dopants, and wherein the individual luminescent dopants are randomly distributed in the matrix material, thereby providing a physically unclonable function device encoding a unique digital identifier.

2. An optically detectable marker according to claim 1, wherein the individual luminescent dopants comprises a third luminescent dopant, wherein the third luminescent dopant comprises a third unique absorption band such that the third luminescent dopant may be excited by illumination of a third wavelength, different from the first and the second wavelength, and wherein the third luminescent dopant is distributed in the matrix material so as to form a third spatial pattern in the matrix material, which third spatial pattern may be optically detected by illuminating the security tag by a light source illuminating light of the third wavelength, each pixel being adapted for encoding at least seven different values of information using combinations of the three different luminescent dopants.

3. An optically detectable marker according to claim 1, wherein the individual luminescent dopants are contained in individual carriers that are embedded in the matrix material.

4. An optically detectable marker according to claim 3, wherein the individual carriers are microporous, mesoporous or macroporous structures.

5. An optically detectable marker according to claim 1, wherein the individual luminescent dopants are chosen from the group of: luminescent dyes, luminescent elements, quantum dots, rare earth dopants or lanthanides.

6. An optically detectable marker according to claim 5, wherein the individual luminescent dopants includes lanthanides chosen from the group of: Ce, Nd, Sm, Ho, Pr, Dy, Eu, Tm, Yb, Tb, or Er.

7. An optically detectable marker according to claim 1, wherein the first wavelength and the second wavelength are within 100 nm of each other.

8. An optically detectable marker according to claim 1, further comprising a third luminescent dopant, wherein
the third luminescent dopant comprises a third unique absorption band such that the third luminescent dopant may be excited by illumination of a third wavelength, different from the first and second wavelength, and wherein the third luminescent dopant is distributed in the matrix material so as to form a third spatial pattern in the matrix material, which third spatial pattern may be optically detected by illuminating the security tag by a light source illuminating light of the third wavelength, wherein
the first wavelength, the second wavelength, and the third wavelength are located within 50 nm of each other.

9. An optical detectable marker according to claim 8, wherein the first luminescent dopant, the second luminescent dopant, and the third luminescent dopant are lanthanideslathanides chosen from the group of europium, terbium and dysprosium ions.

10. A product provided with an optically detectable marker according to claim 1.

11. A security system comprising:
an optically detectable marker according to claim 1, and
an optical read-out system, which comprises:
one or more light sources that are configured to separately target the unique absorption bands of the individual luminescent dopants of the optically detectable marker, and
a detection system configured to read out a spatial pattern associated with the individual luminescent dopants of the optically detectable marker.

12. A security system according to claim 11, wherein the security system further comprises a database of stored security tags.

13. A security system according to claim 12, wherein the security system further comprises a comparison module, which is configured to compare detected spatial patterns with stored security tags.

14. A security system according to claim 11, wherein the one or more light sources comprise a tunable light source.

15. A physical key identifying an asset represented in a block chain ledger, the physical key comprising an optical detectable marker according to claim 1.

16. A physical key asserting ownership of a block chain wallet, the physical key comprising an optical detectable marker according to claim 1.

17. A method of reading out an optically detectable marker, the marker providing a physically unclonable function device encoding a unique digital identifier, wherein
the optically detectable marker comprises a matrix material, which is doped with a plurality of individual luminescent dopants comprising at least:
a first luminescent dopants comprising a first unique absorption band such that the first luminescent dopants may be excited by illumination of a first wavelength, wherein the first luminescent dopants are arranged in a first spatial pattern in the optically detectable marker; and
a second luminescent dopants comprising a second unique absorption band such that the second luminescent dopants may be excited by illumination of a second wavelength, wherein the second luminescent dopants are arranged in a second spatial pattern in the optically detectable marker,
wherein the spatial patterns in the marker are divided into pixels, each pixel being adapted for encoding four different values of information using combinations of the two different luminescent dopants, and wherein the individual luminescent dopants are randomly distributed in the matrix material,
wherein the method comprises the steps of:
a) optically exciting the first luminescent dopants by illuminating the optically detectable marker with light of the first wavelength,
b) reading out the first spatial pattern,
c) optically exciting the second luminescent dopants by illuminating the optically detectable marker with light of the second wavelength, and
d) reading out the second spatial pattern.

18. A method according to claim 17, wherein the read out spatial patterns are run through a noise-reducing filtering process, comprising steps of:
subtracting background noise levels, and/or
digitizing pixels by comparing intensities of a pixel after different excitations according to crosstalk thresholds, and/or
digitizing pixels by comparing measured intensity levels with predetermined intensity threshold levels.

19. A method according to claim 17, wherein the method comprises the additional step of:
A) illuminating the optically detectable marker by scattered light or light in a wavelength lower than the first and second wavelength, and
B) reading out an overall pattern.

20. A method according to claim 17, wherein the plurality of individual dopants further comprises:
a third luminescent dopants comprising a third unique absorption band such that the third luminescent dopants may be excited by illumination of a third wavelength, wherein the third luminescent dopants are arranged in a third spatial pattern in the optically detectable marker,
wherein the method further comprises the steps of:
e) optically exciting the third luminescent dopants by illuminating the optically detectable marker with light of the third wavelength, and
f) reading out the third spatial pattern,
wherein the first wavelength, the second wavelength, and the third wavelength are located within 50 nm of each other.

* * * * *